No. 609,242. Patented Aug. 16, 1898.
G. W. REAM.
HARROW.
(Application filed Jan. 18, 1898.)
(No Model.)

Attest
Wm. F. Hall
F. L. Middleton

Inventor
Geo. W. Ream
by Geo. Spear
Atty.

THE NORRIS PETERS CO., PHOTO-LITHO., WASHINGTON, D. C.

UNITED STATES PATENT OFFICE.

GEORGE W. REAM, OF CANTON, OHIO, ASSIGNOR TO THE BUCHER & GIBBS PLOW COMPANY, OF SAME PLACE.

HARROW.

SPECIFICATION forming part of Letters Patent No. 609,242, dated August 16, 1898.

Application filed January 18, 1898. Serial No. 667,068. (No model.)

*To all whom it may concern:*

Be it known that I, GEORGE W. REAM, a citizen of the United States, residing at Canton, county of Stark, and State of Ohio, have invented certain new and useful Improvements in Harrows, of which the following is a specification.

My invention relates to that class of harrows in which the teeth are fixed to cross-bars which are pivoted in the sides of the harrow-frame and rock thereon to change the inclination of the teeth. In such harrows heretofore cross-bars of channel-iron have been known to which the teeth were clamped by a clip which embraced the tooth and clamped it to the bar. Also cross-bars of tubular form have been held to the side bars by a cylindrical socket having a pivotal extension and riveted to the tubular bar.

In this my invention I have modified the form of the socket which connects the cross-bar to the side bar and combined it with the bolt which clamps and holds the tooth, so that one bolt is enabled to serve both purposes, and the tooth may be located near the side bar when required so to be placed.

I have illustrated my invention in the accompanying drawings, in which—

Figure 1:
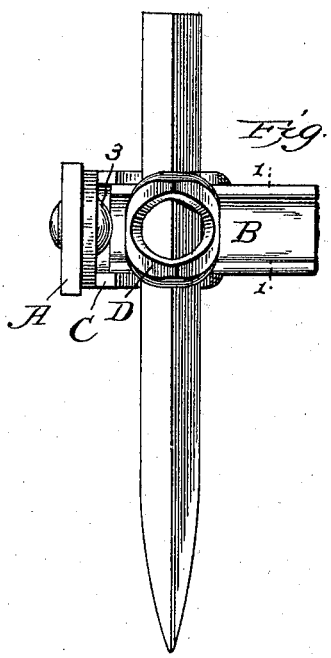
Figure 2:
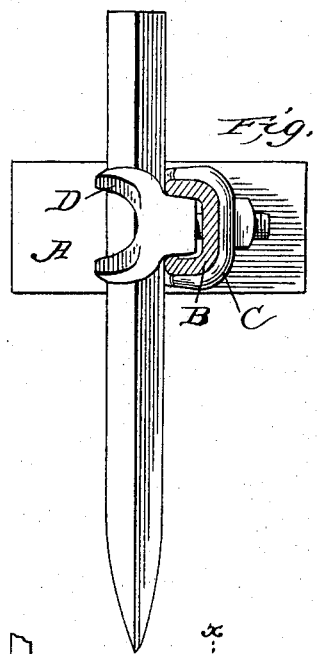
Figure 4:
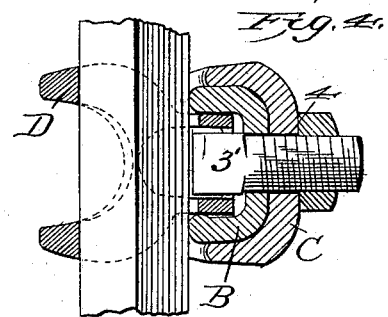
Figure 3:
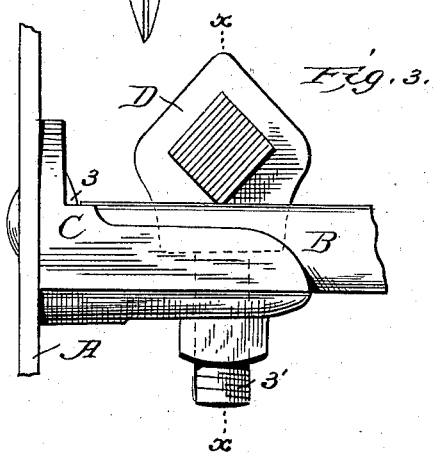
Figure 5:
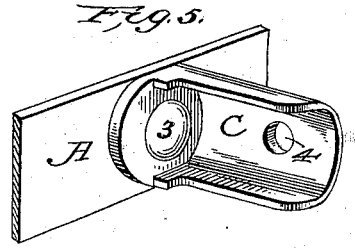

Figure 1 represents part of one side bar and a part of one cross-bar of a harrow with my improved devices in place. Fig. 2 shows a section of the U-bar on line *l l* of Fig. 1, the other parts being in elevation. Fig. 3 is a plan view with the tooth in section. Fig. 4 shows a section on line *x x*, Fig. 3. Fig. 5 is a detail view of the pivotal connection with the side bar.

In the drawings, A represents the side bar of a harrow formed of a plain metal bar. A cross-bar which carries the teeth and is pivoted on the side bar is shown at B in the form of a channel or U bar. The pivoting connection C is a casting consisting of a plate of substantially disk shape, having a curved or channel-shaped flange adapted to fit onto the back of the channel-bar when the end of said bar is in place against the disk. The disk has a central hole through which and the side bar A passes a headed bolt 3, and this bolt is upset on the outside of the side bar. Thus the pivot-piece is held to the side bar and may turn thereon, and as the pivot connection is open on one side the pivot-bolt may be easily inserted and secured. The curved extension has also a hole 4, through which passes the bolt 3' of the clip D. This is of a shape heretofore known, having a socket to hold the tooth with its edge bearing against the edges of the channel-bar. The bolt 3' of the socket passes through a hole in the channel-bar and through the hole 4 in the extension and is held by a nut which serves to clamp the parts closely. The same bolt and nut which holds the socket and tooth also holds the bar to the pivot-piece.

I claim—

In a harrow, a side bar, a cross-bar, a socket-plate pivoted to the side bar and fitting over the cross-bar, a tooth and tooth-holder, the bolt thereof passing through the cross-bar and socket-plate whereby the one bolt secures together the tooth, socket-plate and cross-bar, substantially as described.

In testimony whereof I affix my signature in presence of two witnesses.

GEORGE W. REAM.

Witnesses:
 W. H. CAVNAH,
 GEO. W. JAHN.